June 5, 1923.
R. B. VANCE
COMPUTING MACHINE
Filed Jan. 11, 1921
1,457,411
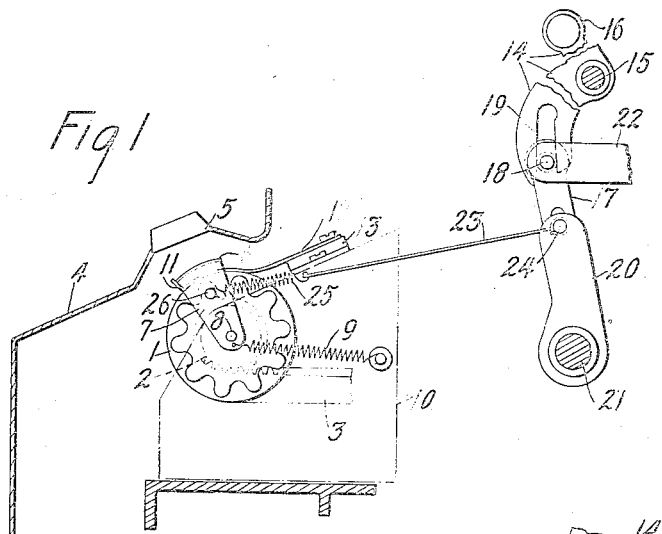
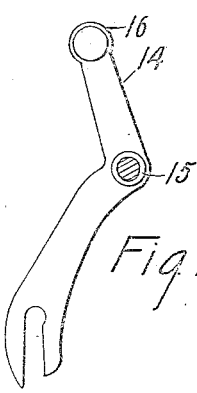
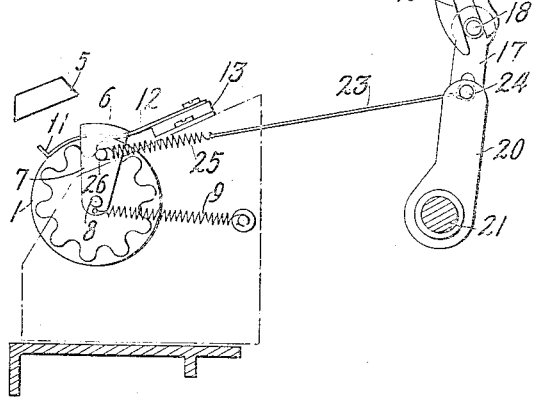
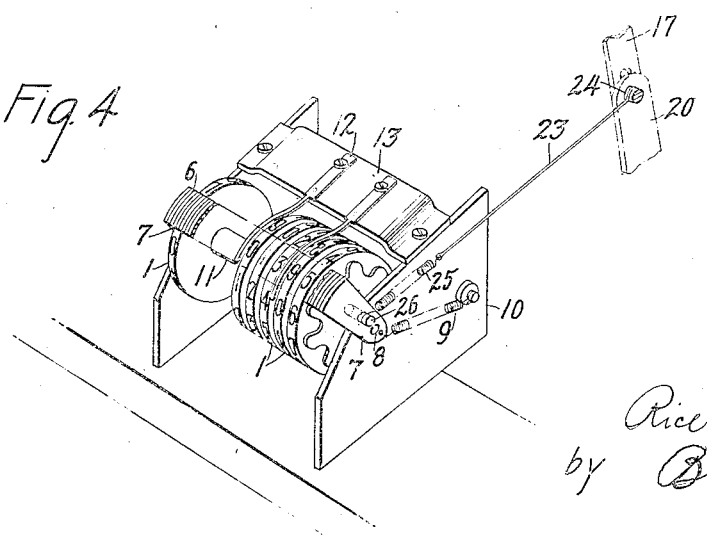
Inventor:
Rice Barr Vance
by B. C. Stickney
Attorney Patented June 5, 1923.

1,457,411

UNITED STATES PATENT OFFICE.

RICE BARR VANCE, OF DETROIT, MICHIGAN, ASSIGNOR TO UNDERWOOD COMPUTING MACHINE COMPANY, OF NEW YORK, N. Y., A CORPORATION OF NEW YORK.

COMPUTING MACHINE.

Application filed January 11, 1921. Serial No. 436,414.

*To all whom it may concern:*

Be it known that I, RICE BARR VANCE, a citizen of the United States, residing in Detroit, in the county of Wayne and State of Michigan, have invented certain new and useful Improvements in Computing Machines, of which the following is a specification.

This invention relates to computing machines, and is herein illustrated as applied to a machine of the Underwood-Hanson type.

In machines heretofore in use, it has been customary after typing and computing different items, to type and compute the total read from the register, subtractively in case of a positive total and additively in case of a negative total, thereby returning the number wheels to zero, and checking the correctness of the total typed. Such machines are usually provided with a star-printing type and means thrown into operation by a star-key for swinging the star-type against the platen, for the purpose of indicating that the totalizer or register is clear. To obtain the result just referred to, means have been provided to prevent depression of the star-key unless all the number wheels are turned to zero.

In certain classes of work it is customary, after the computation by one operator of the sum of the amounts on a plurality of bills or checks, to pass the latter and a slip of paper with the total obtained by the first operator written thereon, on to another operator to check on another machine. It has been found that the second operator sometimes forces the balance by erroneously typing or falsifying the last item to make up for some error, so that the total may correspond with the predetermined total, or, in other words, the total determined by the first operator. This is done by the operator in order to clear the machine and to enable printing of the star which serves as a check.

The main feature of the present invention is the provision of means whereby, in the machine used for checking purposes, the numeral or number wheels will be covered or masked at the sight-opening while the various items are being typed and computed, and means whereby the wheels may be exposed, if necessary, at the end of the computation effected in connection with the typing, such exposure being necessary only, in case the machine is provided with the usual star-key, when the operator of the checking machine finds it impossible to depress the star-key. In case no star-key is provided, it will, of course, be necessary at the end of the computation to shift the shutter to determine whether or not the second computation checks the first. It will be obvious that the reading on the wheels, when exposed, indicates the difference in the results of the two computations.

Another feature of the invention consists in providing controlling means for the shutter such that the latter will always be in effective position when the machine is effective for computation.

According to the present invention, provision is made of a shutter normally lying over the row of digits on the number wheels from which results are to be read; and provision is made whereby the shutter will normally be in effective position to cover or mask said row; and provision is also made of means whereby the shutter may be withdrawn from effective position so as to enable the extent of the difference between the results of the two computations to be determined. Preferably the shutter may be connected to the non-compute key so as to be shifted to ineffective position when the non-compute key is shifted to non-compute position.

Other features and advantages will hereinafter appear.

In the accompanying drawings,

Figure 1 is a fragmentary, side elevation of a portion of an Underwood-Hanson computing machine, with my invention applied thereto, the parts being shown in their normal positions.

Figure 2 is a side view of the non-compute lever fragmentarily shown in Figure 1.

Figure 3 is a view similar to Figure 1, but showing the shutter withdrawn from its effective position by means of the non-compute lever.

Figure 4 is a fragmentary, perspective view of a part of the structure shown in Figure 2.

The number wheels 1 are provided with pinions 2, having a one-way connection therewith, and the latter are driven by racks 3, as is usual in machines of the Underwood-Hanson type. The totalizer in which the number wheels 1 are included may be enclosed in a casing 4, provided with a sight-opening 5 through which results of computations may be read from a certain row of digits on the numeral wheels.

When the machine is in use for checking purposes, the shutter 6, which may be supported by arms 7 on the axis 8 of the number wheels, is normally held in a position to extend across the sight-opening 5 by means of a spring 9, attached to one of the arms 7 at one end, and to one of the end frames 10 of the totalizer at the other end, such position of the shutter being determined by means of a projection or lug 11 upstanding from one of the usual fingers 12, secured to a plate 13 of the totalizer frame and extending between two of the number wheels in a punctuation space. Obviously, more than one of said fingers may be provided with such a projection. In its ineffective position, the rear edge of the shutter may engage the tops of the fingers 12, thus limiting the rearward movement of the shutter.

In order to shift the shutter 6 from its normal position, use may be made of a non-compute lever or key 14 pivoted at 15 on the frame of the machine. Said lever may be provided with a hande 16 at one end, and at its other end may be operatively connected with an arm 17 by means of a stud 18 on the latter extending into a slot 19 of lever 14. The arm 17 may be supported on a bracket 20 mounted on a shaft or pivot 21, and may be connected by means of stud 18 and a link 22 with a device for silencing the computing mechanism. The silencing device may be substantially the same as that shown in the patent to Minton, No. 1,280,065, dated September 24, 1918. The connection between the non-cumpute lever 14 and the shutter 6 may be completed by means of a link 23 connected at one end to a pin 24 on bracket 20, and at the other end by means of a tension spring 25 to a pin 26 on one of said arms 7. It will be obvious that due to the control of the shutter 6 by the non-compute lever 14, the former will always be in its Figure 1 position while the machine is computing.

In practice, the various items, the original computation of which is to be checked, are typed and computed on the machine used for checking and the computing mechanism shifted from a state of addition to that of subtraction, or vice versa, and the result of the previous computation typed and computed. In case the two computations agree, the register or totalizer of the checking machine will be cleared, but if the results disagree, the reading in the totalizer of the checking machine will show the difference therebetween.

During the computation in the checking machine, the shutter 6 will be in its Figure 1 position, and it will be necessary at the end of the computation to determine whether or not the totalizer has been cleared. Machines of the Underwood-Hanson type are usually equipped wih a star-key and star-key printing mechanism, which may be, for example, of the same general type as that disclosed in the patent to Hoyt, No. 1,256,309, dated February 12, 1918, in which the star-key is locked against depression except when the totalizer is clear. If the checking machine is provided with star-key mechanism of this kind, the operator of the checking machine may test the checking operation by pressing on the star-key to depress the same. If successful, it will be evident that the results agree, and no further action will be necessary, but if unsuccessful, the shutter may be shifted by means of the non-compute key to enable the operator to read from the register the discrepancy between the two results.

In case there is no star-key on the checking machine, it will be necessary to shift the shutter to ascertain whether or not the two computations agree.

Variations may be resorted to within the scope of the invention, and portions of the improvements may be used without others.

Having thus described my invention, I claim:

1. In a computing machine to be used for checking previous computations, in combination, a series of number-elements, means to indicate on said number-elements a row of digits from which the results of a computation may be read, means shiftable to render the machine ineffective for computing, a shutter, and means connected with said shiftable means, for holding said shutter in position to mask said row when said machine is effective for computing.

2. In a computing machine to be used for checking previous computations, in combination, a series of number-elements, means to indicate on said number-elements a row of digits from which the result of a computation may be read, a shutter, a non-compute key, means whereby said shutter will be held in position to mask said row when said non-compute key is in normal position, and means whereby actuation of said non-compute key will cause said shutter to be withdrawn from its masking position.

3. In a computing machine, in combination, a totalizer comprising a series of number-wheels, a device having a sight-opening through which the result of a computation may be read from said wheels, a shutter pivoted co-axially with said wheels, means to limit the movement of the shutter in one direction, so that the latter when so positioned will obstruct said sight-opening, yieldable means to maintain said shutter in its normal or obstructing position, and manually-controlled yieldable means for overcoming said first-mentioned yieldable means and withdrawing said shutter from its normal position, so that the amount in the register may be read through said sight-opening.

4. In a computing machine, in combination, a typewriter comprising a series of number-wheels, a device having a sight-opening through which the result of a computation may be read from said wheels, a shutter pivoted co-axially with said wheels, fingers extending over the wheels at punctuation intervals, obstructing means on one or more of said fingers to determine the normal position of said shutter in which the latter obstructs the sight-opening, yielding means to maintain said shutter in its normal or obstructing position, and manually-controlled yieldable means for overcoming said first-mentioned yieldable means, and withdrawing said shutter from its normal position so that the amount in the register may be read through said sight-opening.

5. In a computing machine, in combination, a totalizer comprising a series of number-wheels, a device having a sight-opening through which the result of a computation may be read from said wheels, a shutter pivoted co-axially with said wheels, means normally maintaining the shutter in position to obstruct said sight-opening, a non-compute lever, and means whereby the shutter may be shifted from obstructing position by said non-compute lever, so that the amount in the register may be read through said sight-opening.

6. In a computing machine used for checking the computation in another machine, the result of the first computation being given to the operator of the checking machine, in combination, a series of number-wheels, a device for directing attention to a row of numbers on said wheels, from which row results are to be read, a shutter movable into and out of position to cover the row from which results are to be read, means shiftable to render the machine ineffective for computing, and means connected with said shiftable means for maintaining said shutter normally in position to cover said row, said shutter being withdrawable from its normal position, so that, upon computation of the items and subtracting out or adding in, as required, the total obtained in the first machine, the amount of the difference, if any, between the results of the two computations may be read from said wheels after withdrawal of said shutter from its normal position.

7. In a computing machine to be used for checking previous computations, in combination, a series of number-wheels having rows of digits from one of which the results of computations may be read, a shiftable shutter, means to limit the movement of said shutter in one direction, so that the shutter will be in masking position at the limit of its movement in that direction, means to limit the movement of the shutter when moved in the opposite direction, yieldable means normally holding said shutter in its masking position, and shutter-shifting means including a yieldable connection adapted to overcome the first-mentioned yieldable means and to yield when the shutter reaches the limit of its movement in the opposite direction.

8. In a computing machine to be used for checking previous computations, in combination, number-wheels, means to indicate on said number-wheels a row of digits from which the result of a computation may be read, a shiftable shutter, a stop against which the shutter rests while in masking position with reference to said row, a stop against which said shutter rests when shifted from masking position, a spring device adapted to normally hold said shutter against the first-mentioned stop, and a shutter-shifting device including a member and a spring connecting said member to said shutter, the parts being so arranged and proportioned that the first-mentioned spring will be overcome upon movement of said member and the shutter moved to ineffective position, the second-mentioned spring then yielding in case of further movement of said member.

9. In a computing machine to be used for checking previous computations, in combination, a series of number-wheels, means to indicate on said number-wheels a row of digits from which the result of a computation may be read, a shutter normally masking said row, so that computation of items previously computed may be effected and the result of the previous computation computed additively or subtractively, as required, while said row is hidden, so that the accuracy of the original computation may be checked by means of the usual star key, means to render said machine ineffective for computing, and means whereby said shutter will be held in effective or ineffective position in accordance with the effective or ineffective condition of the machine.

RICE BARR VANCE.

Witnesses:
Lee F. Messenger,
W. R. McDowell.